United States Patent [19]

Inuzuka et al.

[11] Patent Number: 5,329,271
[45] Date of Patent: Jul. 12, 1994

[54] SEMICONDUCTOR STRAIN SENSOR

[75] Inventors: Hajime Inuzuka, Nishio; Tsuyoshi Nakagawa, Gifu; Kunihiko Hara, Nukata, all of Japan

[73] Assignee: Nippondenso Co., Ltd., Kariya, Japan

[21] Appl. No.: 878,429

[22] Filed: May 4, 1992

[30] Foreign Application Priority Data

May 7, 1991 [JP] Japan .................................. 3-101652

[51] Int. Cl.$^5$ .............................................. G01L 1/22
[52] U.S. Cl. ......................................... 338/4; 338/5; 338/36; 338/42
[58] Field of Search ................ 338/4, 2, 5, 36, 42; 361/283; 73/718, 720, 721

[56] References Cited

U.S. PATENT DOCUMENTS 4,965,697 10/1990 Mosser et al. .................. 361/283
4,967,597 11/1990 Yamada et al. .................. 73/516 R

OTHER PUBLICATIONS

"Piezoresistance Effect in Selectively Doped Structure" Kato, Takatoshi et al. ED88-18, P51-56 (1988) Published in 1988.

"Piezoresistance Effect in n-type and p-type A10,3 GaO,7 As/GaAS Selectively Doped Heterostructure Kato", T. et al. pp. 139-142, published 1987.

Primary Examiner—Marvin M. Lateef
Attorney, Agent, or Firm—Cushman, Darby & Cushman

[57] ABSTRACT

A semiconductor strain sensor includes a silicon substrate, a strain resistive element and electrodes. The silicon substrate has a deformable portion which is deformed when stress is applied to it. The strain resistive element is formed on the deformable portion and has an at least a first layer and a second layer which form a heterojunction between them. The first layer is doped with impurities so that a two-dimensional carrier gas layer is formed in the second layer near the heterojunction. The two-dimensional carrier gas layer has carriers originating from the impurities. The electrodes electrically contact the two dimensional carrier gas layer. Change of resistance of the strain resistive element in accordance with the stress is detected through the electrodes.

17 Claims, 3 Drawing Sheets

SEMICONDUCTOR STRAIN SENSOR

BACKGROUND OF THE INVENTION

1. Field of the Invention

The present invention relates to a semiconductor strain sensor for detecting acceleration, pressure or the like.

2. Description of the Related Art

When stress is applied to a semiconductor element, such as silicon, germanium, its resistivity changes. This phenomenon is called the piezoresistance effect. Both pressure sensors and acceleration sensors use the piezoresistance effect.

A conventional semiconductor strain sensor is disclosed in U.S. Pat. No. 4,967,597 and uses silicon for its piezoresistance effect. Silicon has many advantages over other materials—the piezoresistivity of silicon is large, it is mechanically strong, and many techniques for manufacturing devices using silicon have been established.

However, the practical piezoresistivity of silicon is limited at approximately $50 \times 10^{-12}$ cm$^2$/dyn because it cannot self-compensate for temperature when its piezoresistivity is higher than that. Therefore, it has been difficult to use a silicon-based semiconductor strain sensor to detect a very low acceleration or pressure.

The technical report of the Institute of Electronics, Information and Communication engineers, ED88-18, P51–56 (1988) "Piezoresistance Effect in Selectively Doped Structure" by Kato et al., proposed a strain resistive element having a hetero structure of $Al_xGa_{1-x}As/GaAs$. The strain resistive element has a high sensitivity. However, this strain sensor uses $GaAs$ structure on which the hetero structure is formed. Therefore, the strain sensor has not been practically used due to weak mechanical strength of $GaAs$.

SUMMARY OF THE INVENTION

Accordingly, it is an objective of the present invention to provide a semiconductor strain sensor having a high sensitivity.

Another objective of the present invention is to provide a semiconductor strain sensor which is mechanically strong.

To accomplish the foregoing and other objects and in accordance with the purpose of the present invention, a semiconductor strain sensor according to the present invention includes a silicon substrate, a strain resistive element and electrodes. The silicon substrate has a deformable portion which is deformed when stress is applied to it. The mechanical strength of the silicon substrate is stronger than that of a $GaAs$ substrate. The strain resistive element is formed on the deformable portion and has an at least a two-layer structure of a first layer and a second layer which form a heterojunction between them. The first layer is doped with impurities so that a two-dimensional carrier gas layer is formed in the second layer near the heterojunction. The two-dimensional carrier gas layer has carriers attracted by the impurities. The electrodes electrically contact with the two-dimensional carrier gas layer. A change of resistance of the strain resistive element in accordance with the stress is detected through the electrodes.

When the deformable portion is deformed by the stress, charges generate in the first layer in accordance with the stress due to piezoelectric effect. It follows that the impurity concentration of the two-dimensional carrier gas layer changes. The resistance of the two-dimensional carrier gas layer also changes in accordance with the change of impurity concentration.

In a preferred embodiment, a diffusion stopper is formed between the silicon substrate and the strain resistive element. The diffusion stopper prevents silicon atoms in the silicon substrate from diffusing into the strain resistive element. Therefore, the diffusion stopper prevents an electric current from bypassing a current path through the two-dimensional carrier gas layer.

BRIEF DESCRIPTION OF THE DRAWINGS

The features of the present invention that are believed to be novel are set forth with particularity in the appended claims. The invention, together with the objects and advantages thereof, may best be understood by reference to the following description of the presently preferred embodiments together with the accompanying drawings in which:

DESCRIPTION OF THE PREFERRED EMBODIMENTS

The preferred embodiments of the present invention will now be described with reference to the drawings.

Figure 1:
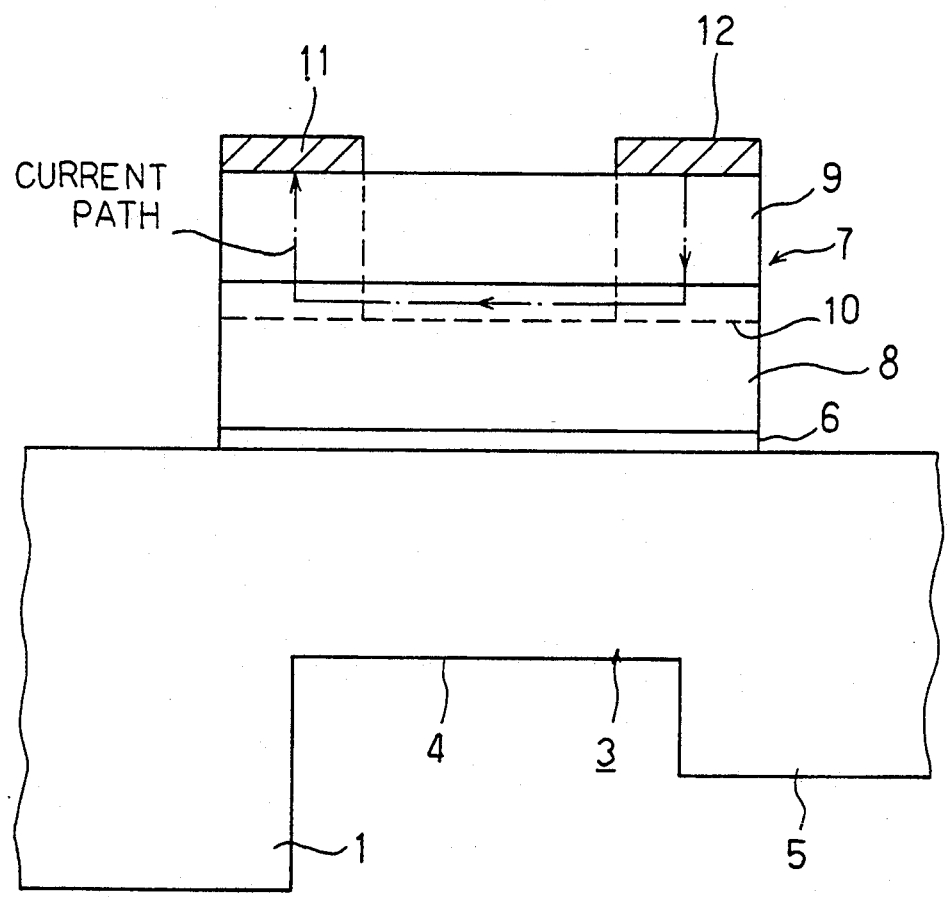
FIG. 1 is a cross-sectional view of a cantilever of a semiconductor acceleration sensor according to a first embodiment.
Figure 2:
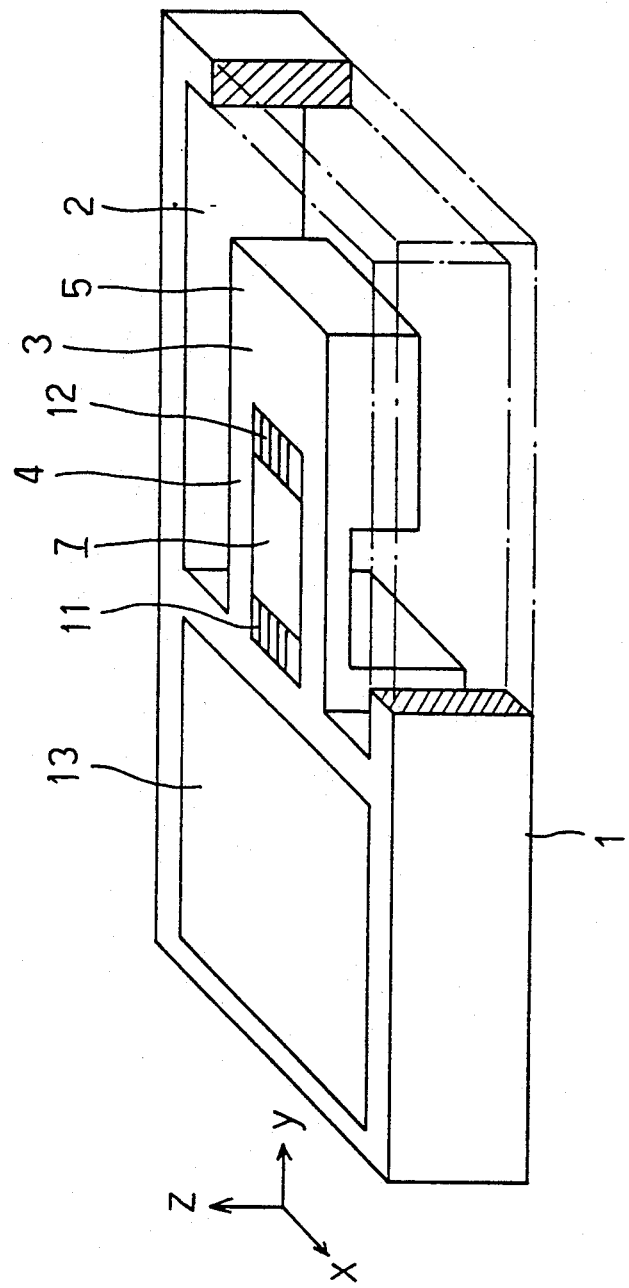
FIG. 2 is a perspective view of the sensor shown in FIG. 1.

FIGS. 1 and 2 show a semiconductor acceleration sensor according to a first embodiment. A single crystal silicon substrate 1 has a face orientation of {111} or {100}. A groove 2 goes through the right-hand side of substrate 1 (in the relative direction of FIGS. 1 and 2) to form a cantilever 3. The cantilever 3 is composed of a thin beam 4 and a thick weight 5 positioned at its tip. The beam portion 4 is thinned by photoetching the substrate 1.

A strain resistive element 7 is disposed on the beam 4 through an $Al_x Ga_{1-x} As$ layer 6, wherein $x \geq 0.3$. The $Al_x Ga_{1-x} As$ layer 6 prevents silicon atoms in the substrate 1 from diffusing into the strain resistive element 7. The strain resistive element 7 has a two-layer structure including GaAs layer 8 and n-$Al_x Ga_{1-x}$ As (x=0.3) layer 9 which are laminated on the $Al_xGa_{1-x}$ As layer 6 in that order. These layers 6, 8 and 9 are formed by a MOCVD (Metal Organic Chemical Vapor Deposition) method or by a MBE (Molecular Beam Epitaxy) method.

More specifically, the $G_aA_s$ layer 8 is preferably grown on the $Al_x Ga_{1-x} As$ layer 6 by a heteroepitaxial growth method. The grown $G_aA_s$ layer 8 has a low carrier concentration and has a zincblende crystalline structure. The n-$Al_xGa1-x$ $A_s$ layer 9 is grown on the $G_aA_s$ layer by an epitaxial growth method and is doped with n-type impurities. The grown n-$Al_x Ga_{1-x}A_s$ layer 9 has a crystal structure of zincblend. The band gap (or energy gap) of the layer 9 is wider than that of the layer 8, and the piezoelectric constant of the layer 9 is larger than that of the layer 8. The layers 8 and 9 form a heterojunction therebetween. Potential energy of carriers (electrons in the case of the present embodiment) at the bottom of a conduction band in an energy band diagram of the layer 9 is higher than that of the layer 8.

The carriers move from the layer 9 to the layer 8 in which the carriers have a relatively lower potential energy. Therefore, the carriers collect in the layer 8 near the interface between the layers 8 and 9 so as to form a two-dimensional carriers gas layer 10.

Spaced apart electrodes 11 and 12 are in ohmic contact with the layer 9. Impurities in the electrodes 11 and 12 diffuse into the two-dimensional carrier gas layer 10 through the layer 9. The electrodes 11 and 12 electrically contact the two-dimensional carrier gas layer 10 through the diffusion of the impurities.

The electrodes 11 and 12 are formed by a so-called lift-off process. More specifically, a resist layer is first formed on the layer 9. The resist layer is photoetched so as to leave a region on which the electrodes 11 and 12 will not be formed. An Au-Ge layer having a thickness of 300 Å and an Au layer having a thickness of 3000 Å are successively formed on the resist layer and the layer 9 by a vacuum evaporation method. The Au-Ge layer and the Au layer on the resist layer are removed by an acetone. The Au-Ge layer and the Au layer are then heated at 500° C. for 90 seconds. The electrodes 11 and 12 are composed of the Au-Ge layer and the Au layer.

FIG. 2 shows peripheral circuits 13 on the left side of the substrate 1. The peripheral circuits 13 can include some transistors, diodes, or the like which are formed by doping impurities into a portion of the substrate 1. The peripheral circuits include a power supply circuit, an amplifying circuit and a temperature compensator which electrically connect with the strain resistive element 7.

Operation of the above-mentioned semiconductor acceleration sensor will be described hereinafter, wherein the face orientation of the substrate 1 is (100).

The X-axis points in the $[0\bar{1}\bar{1}]$ direction of the substrate 1, the Y-axis points in the $[0\bar{1}1]$ direction of the substrate 1, and the Z-axis points in the [100] direction of the substrate 1 in FIG. 2. When acceleration is applied to the substrate 1 in the direction of the Z-axis, the beam 4 is bent toward the negative Z-axis direction due to inertial force of the weight 5. This tensile stress affects the strain resistive element 7 in the direction of the Y-axis. When the stress is applied to the layer 9, the layer 9 polarizes because it has the crystal structure of zincblende type.

Figure 3:
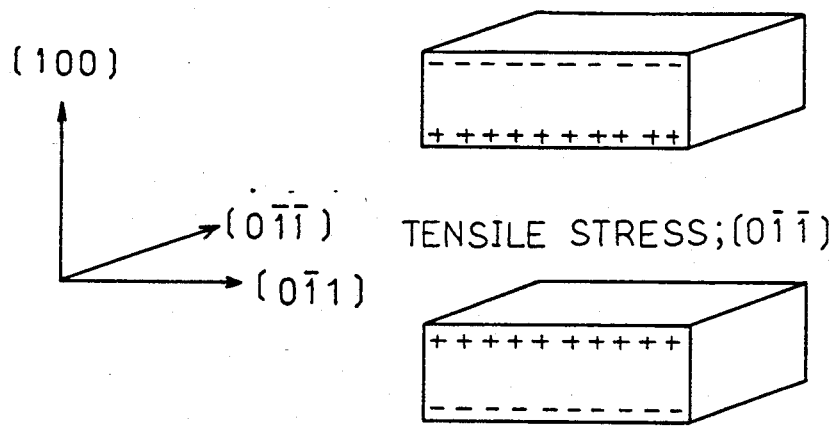
FIG. 3 is a view for explaining polarization.

FIG. 3 shows the relationship between the direction in which the tensile stress is applied and the polarity of polarization. When the tensile stress is applied to the layer 9 in the $[0,\bar{1},1]$ direction, negative charges are generated near the (100) surface of the layer 9 due to the polarization. When the tensile stress is applied to the layer in the $[0,\bar{1},\bar{1}]$ direction, positive charges are generated near the (100) surface of the layer 9. In the two-layer structure shown in FIG. 1, charges are generated in the layer 9 near the interface between the layers 8 and 9 due to the polarization of the layer 9. The carriers in the layer 8 redistribute to electrically equalize the charges. Therefore, the impurity concentration of the two-dimensional carrier gas layer 10 changes, causing the electrical conductivity between the electrodes 11 and 12 to change.

As explained above, the semiconductor acceleration sensor according to the first embodiment has a hetero structure formed by GaAs layer 8 and n−$Al_xGa_{1−x}As$ layer 9 as the strain resistive element 7. Therefore, the sensor according to the first embodiment has a higher sensitivity than the conventional sensor which uses silicon as the semiconductor material which has the piezoresistance effect.

The strain sensor described in the above-mentioned technical report uses $G_aA_s$ as the material of the substrate. On the other hand, the semiconductor acceleration sensor according to the first embodiment uses silicon as the material of the substrate 1. Therefore, the mechanical strength of the device of this embodiment is stronger than that of the strain sensor described in the above-discussed technical report. Moreover, although it is difficult to form the cantilever 3 and the peripheral circuit 13 in a single GaAs substrate, it is easy to form them in a single silicon substrate by using well-known semiconductor processes.

The sensor according to the first embodiment has the $Al_x Ga_{1−x} As$ layer 6 intervening between the silicon substrate 1 and the strain resistive element 7, wherein the layer 6 functions as a diffusion stopper to silicon atoms. Without the $Al_xGa_{1−x}As$ layer 6, silicon atoms in the silicon substrate 1 would diffuse into the $G_aA_s$ layer 8, and the silicon atoms would change the intrinsic conductivity of $G_aA_s$ layer 8 into an n-type conductivity $G_aA_s$ layer. An electric current flowing between the electrodes 11 and 12 bypasses a current path through the two-dimensional carrier gas layer 10, and instead flows through the n-type conductivity $G_aA_s$ layer 8 because of the low resistivity of the layer 8. The resistance of the n-type conductivity of $G_a A_s$ layer 8 is not affected by the polarization of the layer 9. Consequently, the resistance between the electrodes 11 and 12 does not change even if acceleration is applied to the sensor. According to the present embodiment, the $Al_x Ga_{1−x} A_s$ layer 6 prevents the silicon atoms from diffusing into the $G_aA_s$ layer 8. Moreover, aluminum atoms in the $Al_x Ga_{1−x} A_s$ layer 6 prevent the silicon atoms from functioning as donor impurities because the aluminum atoms combine with the silicon atoms so as to form Dx centers.

It is noted that $Z_nS_{ex}S_{1−x}$, $Z_nS_e$, or the like may be used as material of the strain resistive element as an alternative to $Al_x Ga_{1−x} A_s$.

Figure 4:
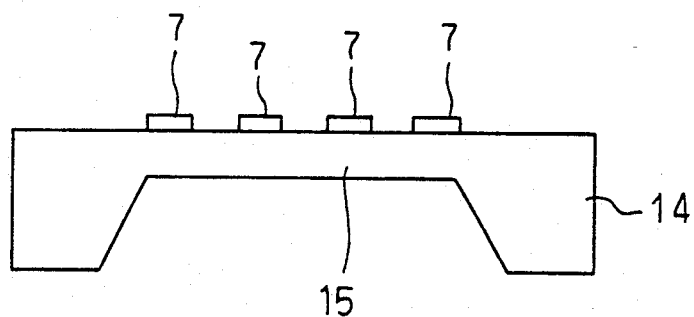
FIG. 4 is a cross-sectional view of a semiconductor pressure sensor according to a second embodiment.

FIG. 4 shows a semiconductor pressure sensor according to a second embodiment. The sensor has a diaphragm 15 which has been formed by thinning the center of a single crystal silicon substrate 14. The strain resistive elements 7 are formed on the diaphragm 15.

According to the second embodiment, when pressure is applied to the diaphragm 15, the diaphragm 15 is deformed. It follows that tensile stress is applied to the strain resistance elements 7 and that the resistance of the elements 7 change in accordance with the pressure. Therefore, the pressure can be indirectly detected by the change of the resistances.

It is noted that, although FIG. 4 shows four strain resistance elements 7 for compensating for temperature, the number of the strain resistance elements 7 may be some other number.

Figure 5:
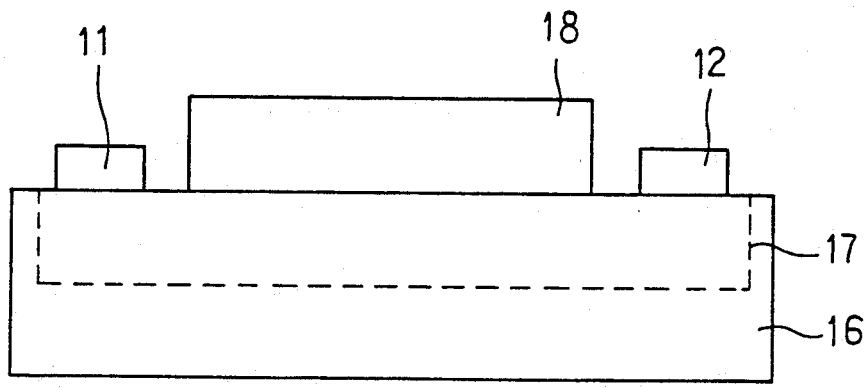
FIG. 5 is a cross-sectional view of a semiconductor pressure sensor according to a third embodiment.

FIG. 5 shows a third embodiment in which the structure of the strain resistive element is modified. A single crystal silicon substrate 16 has an n-type or p-type conductivity. A diffusion layer 17 is formed by diffusing impurities into the substrate 16 and has a conductivity that is opposite to the conductivity of the substrate 16. The substrate 16 and the diffusion layer 17 are electrically isolated from each other. An n-type conductivity SiC layer 18 and the electrodes 11 and 12 are formed on the diffusion layer 17. The strain resistive element is composed of the substrate 16, the diffusion layer 17 and the SiC layer 18.

The present invention has been described with reference to the above-mentioned embodiments, but the present invention is not limited to these embodiments and can be modified without departing from the spirit or concept of the present invention.

What is claimed is:

1. A semiconductor strain sensor, comprising:
   a silicon substrate having a deformable portion which is deformed when stress is applied thereto;
   a strain resistive element formed on said deformable portion, said strain resistive element having at least a first layer and a second layer which form a heterojunction therebetween, said first layer being doped with impurities so to form a two-dimensional carrier gas layer in said second layer near said heterojunction, and said two-dimensional carrier gas layer having carriers originating from said impurities; and
   at least two electrodes for detecting change of resistance of said strain resistance element in accordance with said stress, said electrodes electrically contacting said two-dimensional carrier gas layer.

2. A semiconductor strain sensor according to claim 1, wherein said silicon substrate is a single crystal silicon substrate.

3. A semiconductor strain sensor according to claim 2, wherein said first layer is an n-type conductivity $Al_xGa_{1-x}As$ layer, wherein $x=0.3$, and said second layer is a $GaAs$ layer.

4. A semiconductor strain sensor according to claim 3, wherein said electrodes are formed on said n-type conductivity $Al_xGa_{1-x}As$ layer.

5. A semiconductor strain sensor according to claim 1, wherein said silicon substrate has a main portion and a cantilevered portion extending away from said main portion, said deformable portion being part of said cantilevered portion.

6. A semiconductor strain sensor according to claim 1, wherein said deformable portion is a diaphragm.

7. A semiconductor strain sensor according to claim 2, further comprising a diffusion stopper which intervenes between said silicon substrate and said strain resistive element, said diffusion stopper preventing silicon atoms in said silicon substrate from diffusing into said strain resistive element.

8. A semiconductor strain sensor according to claim 7, wherein said diffusion stopper is an $Al_xGa_{1-x}As$ layer, wherein $x \geq 0.3$.

9. A semiconductor strain sensor according to claim 8, wherein said first layer is an n-type conductivity $Al_xGa_{1-x}As$ layer, wherein $x=0.3$, and said second layer is a $GaAs$ layer.

10. A semiconductor strain sensor according to claim 2, further comprising an activating layer between said silicon substrate and said strain resistive element, said activating layer activating silicon atoms diffusing from said silicon substrate toward said strain resistive element.

11. A semiconductor strain sensor according to claim 10, wherein said activating layer is an $Al_xGa_{1-x}As$ layer, wherein $x \geq 0.3$.

12. A semiconductor strain sensor according to claim 2, further comprising a peripheral circuit which is formed in said silicon substrate, said peripheral circuit electrically connecting with said strain resistive element.

13. A semiconductor strain sensor according to claim 12, wherein said peripheral circuit includes at least one of a power supply circuit, an amplifying circuit and a temperature compensator.

14. A semiconductor strain sensor according to claim 2, wherein a band gap of said first layer is wider than a bandgap of said second layer.

15. A semiconductor strain sensor according to claim 7, wherein at least one layer of said first layer and said second layer is made of compound semiconductor, said one layer being formed on said diffusing stopper.

16. A semiconductor strain sensor, comprising:
   a single crystal silicon substrate having a deformable portion which is deformed when stress is applied thereto;
   a first $Al_xGa_{1-x}As$ layer formed on said deformable portion, wherein $x \geq 0.3$;
   a GaAs layer formed on said first $Al_xGa_{1-x}As$ layer;
   a second $Al_xGa_{1-x}As$ layer formed on said GaAs layer, wherein $x=0.3$, said GaAs layer and said second $Al_xGa_{1-x}As$ layer forming a heterojunction therebetween, said second $Al_xGa_{1-x}As$ layer being doped with impurities so that a two-dimensional carrier gas layer is formed in said GaAs layer near said heterojunction, and said two-dimensional carrier gas layer having carriers originating from said impurities; and
   electrodes for detecting a change of resistance of said two-dimensional carrier gas layer in accordance with said stress, said electrodes being formed on said second $Al_xGa_{1-x}As$ layer and electrically contacting said two-dimensional carrier gas layer.

17. A semiconductor strain sensor according to claim 16, wherein said second $Al_xGa_{1-x}As$ layer has an n-type conductivity.

* * * * *